Patented Apr. 30, 1935

1,999,196

UNITED STATES PATENT OFFICE 1,999,196

PROCESS FOR THE PREPARATION OF CONDENSATION PRODUCTS

Wilbur A. Lazier, Wilmington, Del., assignor to E. I. du Pont de Nemours & Company, Wilmington, Del., a corporation of Delaware No Drawing. Application November 25, 1932, Serial No. 644,275

5 Claims. (Cl. 260—134)

This invention relates to the production of higher molecular weight compounds from secondary alcohols and more particularly to a process for the production of condensation products of ketones by the dehydrogenation of secondary aliphatic alcohols. This application is a continuation in part of U. S. Patent 1,895,516 filed January 9, 1930.

It is an object of this invention to provide a process for the production of condensation products of a higher molecular weight from secondary alcohols.

Other objects and advantages of the invention will be apparent by reference to the following specification wherein its details and preferred embodiments are described.

According to this invention organic compounds having a higher number of carbon atoms, such as ketones, alcohols, and hydrocarbons, are obtained in good yield by subjecting the vapor of a secondary alcohol to the action of a dehydrogenating catalyst at an elevated temperature and pressure.

As catalysts for dehydrogenation, there may be employed, according to this invention, difficultly reducible dehydrogenating oxides such as zinc oxide, manganese oxide, or magnesium oxide, or mixtures of these with each other or with other oxides, or metals. Such other oxides may desirably be oxides less active but more acidic than zinc oxide and the like, such as the oxides of vanadium, tungsten, molybdenum or uranium, which may serve as promoters for the dehydrogenating oxides. I prefer, however, to use a catalyst including one or more elements, the catalytic characteristics of which are predominantly dehydrogenating, and one or more metal oxides of dehydrating characteristics, such as chromium oxide, aluminum oxide, thorium oxide, and the like. Preferably the dehydrogenating elements are in the combined state, for example in the form of the oxide, or better, in the form of a chemical compound with a dehydrating metal oxide. Suitable catalysts of the type referred to as well as methods for the preparation thereof are set forth in Lazier U. S. Patents Nos. 1,746,782, 1,746,783, and 1,857,921.

I have found that a particularly useful catalyst according to my invention comprises a promoted dehydrogenation catalyst consisting substantially of chromium oxide and an oxide selected from the group, manganese oxide and zinc oxide.

The temperature employed in my process may vary over a wide range depending particularly upon the operating characteristics of the catalyst used. The temperature should be sufficient to effect the desired reaction but not so high as to promote the exclusive formation of hydrocarbons. Preferably temperatures of from 200–500° C. are employed. As previously indicated, in order to obtain good yields of condensation products containing a higher number of carbon atoms, elevated pressures, preferably of at least 2 to about 750 atmospheres, must be used, the lower the pressure the lower the yield of condensation products and the higher the pressure the greater the yield of higher alcohols and other condensation products.

The reaction may be conducted either by a prolonged contact of the secondary alcohol with the catalyst at a relatively low temperature as in the liquid phase treatment of the alcohol in a batch process or the alcohols may be vaporized by passing in a continuous manner over the catalyst in granular form at a somewhat higher temperature. The rate of the flow according to this method will be determined by the operating temperature and the exact nature of the product desired. For each catalyst volume there may be passed over the catalyst from 1 to 10 volumes per hour of liquid alcohol in the form of its vapor.

Although the process of this invention is applicable to secondary aliphatic alcohols generally, such as isopropanol, secondary butanol, diethyl carbinol, methyl normal propyl carbinol, methyl isopropyl carbinol and the like, the preferred procedure may be illustrated by the use of the secondary alcohol, isopropanol, as an example:

845 parts by volume of isopropanol are vaporized and passed over 25 parts of a zinc-copper-cadmium chromite catalyst (as described in U. S. Patent 1,964,041) contained in a pressure resistant reaction chamber, at a temperature of 390° C. and at a pressure of 200 atmospheres, at the rate of 210 parts by volume per hour. The products are condensed, with cooling, and separated from the disengaged hydrogen. The condensate contains, in addition to acetone and small amounts of unchanged isopropanol, substantial quantities of low boiling hydrocarbons, higher alcohols and ketones, and other higher condensation products.

In like manner 100 parts by volume of secondary butyl alcohol are vaporized and passed per hour over 25 parts of a zinc-copper-cadmium chromite catalyst, as described in the first example, contained in a pressure resistant reaction chamber, at a temperature of 350° C. and 200 atmospheres pressure. The products are condensed and separated from disengaged hydrogen. The condensate contains, in addition to ethyl methyl ketone and small amounts of unchanged secondary butyl alcohol, substantial quantities of low boiling hydrocarbons, higher alcohols and ketones and other higher condensation products.

Whereas conducting the reaction under pressure yields the condensation products described, the dehydrogenation of secondary alcohols carried out as described above except that the pressure is atmospheric yields as the dehydrogenation product low boiling ketones substantially free from condensation and/or degradation products.

In a similar manner other secondary alcohols, such, for example, as those previously mentioned, may be treated to give condensation products which are highly valuable, for example, as denaturants.

Various changes may be made in the methods or process hereinbefore described without departing from the invention or sacrificing any of the advantages thereof.

I claim:

1. A process for the production of condensation products which comprises subjecting a secondary aliphatic alcohol to contact with a dehydrogenation catalyst at a temperature of from about 200–500° C. and at a pressure of from at least 2 to about 750 atmospheres, said catalyst consisting substantially of chromium oxide and an oxide selected from the group consisting of manganese oxide and zinc oxide.

2. A process for the production of condensation products which comprises subjecting a secondary aliphatic alcohol to a temperature of about 380° C. and a pressure of about 200 atmospheres in the presence of a dehydrogenation catalyst, said catalyst consisting substantially of chromium oxide and an oxide selected from the group consisting of manganese oxide and zinc oxide.

3. A process for the production of condensation products which comprises subjecting a secondary aliphatic alcohol to contact with a dehydrogenation catalyst at a temperature of from 200–500° C., and a pressure of from 2 to 750 atmospheres, said catalyst consisting substantially of a difficultly reducible dehydrogenating metal oxide and a more acidic metal oxide.

4. A process for the production of condensation products which comprises subjecting a secondary aliphatic alcohol to contact with a dehydrogenation catalyst at a temperature of from 200–500° C., and a pressure of from 2 to 750 atmospheres, said catalyst consisting substantially of a difficultly reducible dehydrogenating metal oxide and an acidic oxide selected from a group consisting of vanadium, tungsten, molybdenum and uranium.

5. A process for the production of condensation products which comprises subjecting a secondary aliphatic alcohol to contact with a dehydrogenation catalyst at a temperature of from 200–500° C., and a pressure of from 2 to 750 atmospheres, said catalyst consisting substantially of a difficultly reducible dehydrogenating metal oxide and a dehydrating metal oxide.

WILBUR A. LAZIER.